(12) United States Patent
Abdulov et al.

(10) Patent No.: US 10,990,348 B2
(45) Date of Patent: Apr. 27, 2021

(54) DETECTION METHOD AND DETECTION DEVICE FOR AUDIO SIGNAL

(71) Applicant: Tymphany Acoustic Technology Limited, Taipei (TW)

(72) Inventors: Dmitry Abdulov, Taipei (TW); Hing Lung Sung, Taipei (TW); Alexey Abdulov, Taipei (TW)

(73) Assignee: TYMPHANY ACOUSTIC TECHNOLOGY LIMITED, Taipei (TW)

( * ) Notice: Subject to any disclaimer, the term of this patent is extended or adjusted under 35 U.S.C. 154(b) by 0 days.

(21) Appl. No.: 16/894,274

(22) Filed: Jun. 5, 2020

(65) Prior Publication Data

US 2020/0387338 A1 Dec. 10, 2020

(30) Foreign Application Priority Data

Jun. 6, 2019 (CN) .......................... 201910492427.0

(51) Int. Cl.
*G06F 3/16* (2006.01)

(52) U.S. Cl.
CPC .............. *G06F 3/162* (2013.01); *G06F 3/165* (2013.01)

(58) Field of Classification Search
CPC ......... G06F 3/162; G06F 3/165; H04N 11/00; G01H 3/14; H04R 29/00; H04R 29/001; H04R 29/004; H04R 3/005; H04R 27/00; H04S 7/40; H04S 7/301
USPC .................................................... 381/56, 58
See application file for complete search history.

(56) References Cited

U.S. PATENT DOCUMENTS

| 6,933,866 | B1 * | 8/2005 | Weitz ...................... H03M 5/12 341/50 |
| 8,350,734 | B1 * | 1/2013 | Mallinson ............... H03M 7/02 341/59 |
| 2001/0033629 | A1 * | 10/2001 | Ito .......................... G11B 20/10 375/368 |
| 2005/0094756 | A1 * | 5/2005 | Bertram .............. H04L 25/4904 375/360 |
| 2009/0287329 | A1 * | 11/2009 | Yoshioka ............... H03G 3/348 700/94 |
| 2011/0261969 | A1 * | 10/2011 | Elkhatib .................. H04L 7/033 381/22 |
| 2016/0254902 | A1 * | 9/2016 | Nagase ................... G06F 1/325 375/333 |
| 2017/0302633 | A1 * | 10/2017 | Ichimura .............. H04N 21/439 |

* cited by examiner

*Primary Examiner* — Ahmad F. Matar
*Assistant Examiner* — Sabrina Diaz
(74) *Attorney, Agent, or Firm* — Muncy, Geissler, Olds & Lowe, P.C.

(57) ABSTRACT

The present application discloses a detection method and a detection device for the audio signal, the detection method comprising one or multiple times of audio detection, the audio signal is a SPDIF signal, and each time of the audio detection comprises: a statistical sampling step, sampling the SPDIF signal based on Biphase Mark Code, and counting according to the sampled data to obtain the number of state changes or the number of state unchanges of the SPDIF signal; and a determination step, determining whether the SPDIF signal is a muted SPDIF signal according to whether the number of state changes or the number of state unchanges of the SPDIF signal is within a predetermined range. The purpose of this application is at least to achieve the music detection function of the audio signal without performing full signal decoding on the SPDIF signal.

16 Claims, 3 Drawing Sheets

Sample an SPDIF signal based on BMC, and count according to the sampled data to obtain the number of state changes or the number of state unchanges of the SPDIF signal — S10

Determine whether the SPDIF signal is a silent SPDIF signal according to whether the number of state changes or the number of state unchanges of the SPDIF signal is within a predetermined range — S20

DETECTION METHOD AND DETECTION DEVICE FOR AUDIO SIGNAL

TECHNICAL FIELD

The application relates to the technical field of audio signal processing, and in particular to a detection method for an audio signal and a detection device for the audio signal.

BACKGROUND

Sony/Philips Digital Interface (SPDIF) is an abbreviation of Sony and Philips digital audio interfaces. Generally, the DSP chip is responsible for music detection on an SPDIF signal. The DSP chip has an SPDIF decoder, which may do full signal decoding and provide a current signal level for the music detection in response to requests sent by a Microcontroller Unit (MCU) anytime.

However, sometime its problematic to use the DSP chip to perform music detection because the DSP chip may be removed from projects (for example, some projects are not require support of EQ (Equalizer) setting) to reduce the cost. Or, in some mode like system standby there are strict requirements for power consumptions, so the DSP chip may be shutdown to comply these requirements.

SUMMARY OF THE APPLICATION

In view of the above-mentioned problems in the prior art, the application provides a detection method for an audio signal and a detection device for the audio signal, which can implement a music detection function of the audio signal without full signal decoding on an SPDIF signal.

The technical solution of the present application is implemented as follows:

According to an aspect of the present invention, a detection method for an audio signal is provided, the audio signal is a SPDIF signal, and each time of the audio detection comprises:

a statistical sampling step, sampling the SPDIF signal based on Biphase Mark Code (BMC), and counting according to the sampled data to obtain the number of state changes or the number of state unchanges of the SPDIF signal; and a determination step, determining whether the SPDIF signal is a muted SPDIF signal according to whether the number of state changes or the number of state unchanges of the SPDIF signal is within a predetermined range.

According to an embodiment of the present application, the multiple times of audio detection comprises a first audio detection and a second audio detection, and the first audio detection and the second audio detection are separated by a predetermined time interval.

According to an embodiment of the present application, the audio detection is performed by a Microcontroller Unit (MCU).

According to an embodiment of the present application, at the statistical sampling step, a period for sampling the SPDIF signal is several times of a length of a signal clock of the SPDIF signal.

According to an embodiment of the present application, determining whether the number of state changes or the number of state unchanges of the SPDIF signal is within the predetermined range according to a ratio of the number of same sampling values in the sampled data.

According to an embodiment of the present application, when the ratio of the number is at least 75%, determining that the number of state changes of the SPDIF signal is within the predetermined range, and thus determining the SPDIF signal is muted SPDIF signal.

According to an embodiment of the present application, the ratio of the number is at least 75% defined as: the ratio of the number of same sampling values obtained by continuous sampling is at least 75%.

According to an embodiment of the present application, when the number of state changes of the SPDIF signal is within a first predetermined range, determining that the SPDIF signal is muted SPDIF signal; and when the number of state changes of the SPDIF signal is within a second predetermined range, determining that the SPDIF signal is a music playing SPDIF signal, the second predetermined range being different from the first predetermined range.

According to another aspect of the present invention, a detection device for an audio signal is provided, wherein the audio signal is a SPDIF signal, and the detection device comprises:

a statistical sampling module, configured to sample the SPDIF signal based on Biphase Mark Code (BMC), and count according to the sampled data to obtain the number of state changes or the number of state unchanges of the SPDIF signal; and a determination module, configured to determine whether the SPDIF signal is a muted SPDIF signal according to whether the number of state changes or the number of state unchanges of the SPDIF signal is within a predetermined range.

According to an embodiment of the present application, further comprising a timer, configured to set a time interval between two adjacent audio detections.

According to an embodiment of the present application, the statistical sampling module and the determination module are a program module in a Microcontroller Unit (MCU), a GPIO pin of the MCU is connected with an SPDIF pin, and the statistical sampling module samples the SPDIF signal input from the SPDIF pin.

According to an embodiment of the present application, the statistical sampling module is configured to sample the SPDIF signal at a first sampling period, the first sampling period being several times of a length of a signal clock of the SPDIF signal.

According to an embodiment of the present application, the determination module is configured to: determine whether the number of state changes or the number of state unchanges of the SPDIF signal is within the predetermined range according to a ratio of the number of same sampling values in the sampled data.

According to an embodiment of the present application, the determination module is configured to: when the ratio of the number is at least 75%, determine that the number of state changes of the SPDIF signal is within the predetermined range, and thus determine that the SPDIF signal is the muted SPDIF signal.

According to an embodiment of the present application, the ratio of the number is at least 75% defined as: the ratio of the number of same sampling values obtained by continuous sampling is at least 75%.

According to an embodiment of the present application, wherein the determination module is configured to: determine, when the number of state changes of the SPDIF signal is within a first predetermined range, that the SPDIF signal is muted SPDIF signal; and determine, when the number of state changes of the SPDIF signal is within a second predetermined range, that the SPDIF signal is a music playing SPDIF signal, the second predetermined range being different from the first predetermined range.

By counting sampled data of an SPDIF signal to obtain the number of state changes or the number of state unchanges of the SPDIF signal, and determining whether the SPDIF signal is a muted SPDIF signal according to whether the number of state changes or the number of state unchanges of the SPDIF signal is within a predetermined range, a music detection function of the SPDIF signal is achieved without full decoding on the SPDIF signal.

The DSP chip may be unnecessary to perform the full signal decoding, and a lower-power MCU performs statistical sampling and makes a determination on the SPDIF signal. Therefore, the MUC that cannot perform the full signal decoding on the SPDIF signal implements the music detection function of the SPDIF signal.

By performing multiple times of audio detection at a predetermined time interval, the power consumption of the system may further be reduced. When the MCU is used to perform the audio detection, the MCU is less loaded than the MCU performing frequent audio detection, therefore, the power consumption is reduced.

BRIEF DESCRIPTION OF THE ACCOMPANYING DRAWINGS

In order to illustrate the technical solutions in the embodiments of the present application in the prior art more clearly, the drawings which are required to be used in the description of the embodiments of the present application are briefly described below. It is obvious that the drawings described below are only some embodiments of the present disclosure. It is apparent to those skilled in the art that other drawings may be obtained based on the accompanying drawings without giving inventive effort.

DETAILED DESCRIPTION OF THE PREFERRED EMBODIMENTS

The technical solutions of the embodiments of the present application will be clearly and completely described in the following with reference to the accompanying drawings. It is obvious that the embodiments to be described are only a part the embodiments of the present application rather than all of the embodiments of the present application. All other embodiments obtained by the skilled in the art based on the embodiments of the present application are within the protection scope of the present application.

Figure 1:
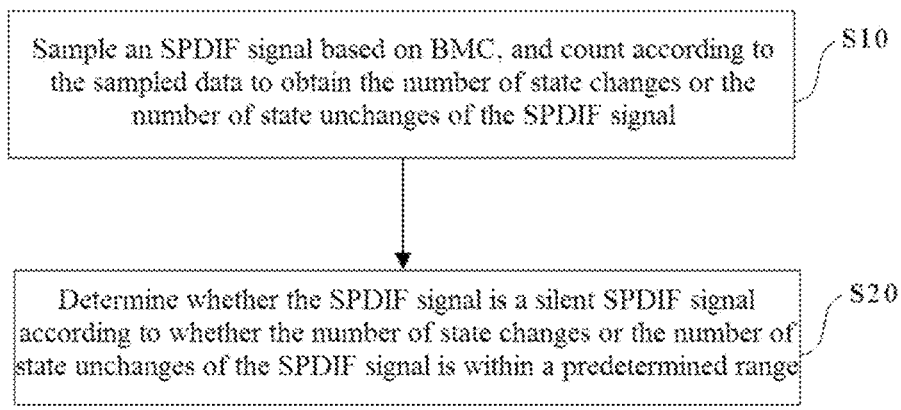
FIG. 1 illustrates a flowchart of a detection method for an audio signal according to one embodiment of the application.
Figure 2:
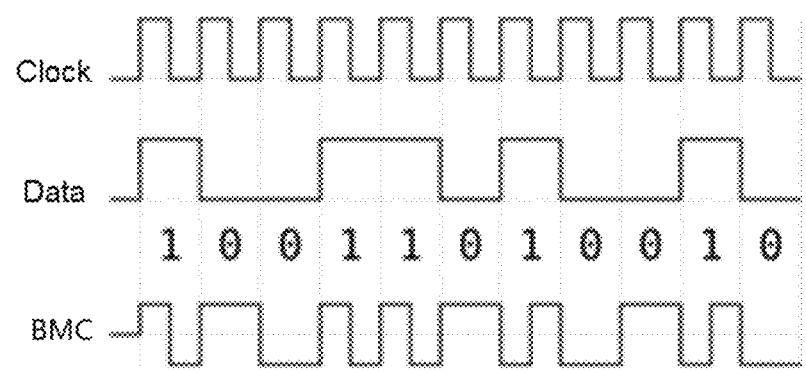
FIG. 2 illustrates a schematic diagram of an encode definition of BMC.

According to one embodiment of the application, a detection method for an audio signal is provided. FIG. 1 illustrates a flowchart of a detection method for an audio signal according to one embodiment of the application. The detection method for the audio signal of the application includes one or multiple times of audio detection. As shown in FIG. 1, the audio detection each time includes a statistical sampling step S10 and a determination step S20. At the statistical sampling step S10, an SPDIF signals based on Bi-phase Mark Coding (BMC) is sampled. FIG. 2 illustrates a schematic diagram of a encode definition of BMC. As shown in FIG. 2, the BMC encoding has a characteristic of converting a level at start of each clock period of data. Within one clock period, a logical value of the data is represented by means of level conversion. For example, if the level is converted in the clock period, means the logical value of the data is "1"; or otherwise, means the logical value of the data is "0". In the present application, it may be appropriate to use a BMC code 1 to indicate the state change of the SPDIF signal, and a BMC code 0 to indicate the state unchange of the SPDIF signal. Therefore, by sampling the SPDIF signal that based on the BMC, and the number of state changes or the number of state unchanges of the SPDIF signal may be counted according to the sampled data.

As shown in FIG. 1, at the determination step S20, whether the SPDIF signal is a muted SPDIF signal may be determined according to whether the number of state changes or the number of state unchanges of the SPDIF signal is within a predetermined range. If it is determined that the SPDIF signal is the muted SPDIF signal, it may be indicated that there is no music playing in the SPDIF signal, that is, the SPDIF signal transmits a silence. If it is determined that the SPDIF signal is not the muted SPDIF signal, it may be indicated that there is music playing in the SPDIF signal. Therefore, whether there is the music playing in the SPDIF signal can be determined, and music detection of the SPDIF signal is achieved.

According to the above technical solutions of the application, by counting sampled data of an SPDIF signal to obtain the number of state changes or the number of state unchanges of the SPDIF signal, and determining whether the SPDIF signal is a muted SPDIF signal according to whether the number of state changes or the number of state unchanges of the SPDIF signal is within a predetermined range, a music detection function of the SPDIF signal is achieved without full decoding on the SPDIF signal.

The number of state changes of the SPDIF signal will be within a first predetermined range when there is no music playing in the SPDIF signal. The number of state changes of the SPDIF signal will be within a second predetermined range, when there is music playing in the SPDIF signal. Therefore, in some embodiments, when the number of state changes of the SPDIF signal is within the first predetermined range, it can be determined that the SPDIF signal is the muted SPDIF signal; and when the number of state changes of the SPDIF signal is within the second predetermined range, it can be determined that the SPDIF signal is a music playing SPDIF signal. Wherein the second predetermined range is different from the first predetermined range. The first predetermined range and the second predetermined range may be configured according to actual applications.

In some embodiments, the audio detection may be performed by an MCU. That is, the statistical sampling step S10 and the determination step S20 were performed by the MCU. For example, in a loudspeaker system having an SPDIF signal input source, a DSP chip and an MCU, because the power consumption of the loudspeaker system in a standby mode must be restricted below an allowed value, a high-power device, such the DSP chip, is turned off in the standby mode. Only the MCU is turned on in this case. In one embodiment, the SPDIF signal may be connected to, for example, a GPIO (General-Purpose Input/Output) pin of the MCU, thus the statistical sampling step S10 and the determination step S20 on the SPDIF signal may be performed by the low-power MCU, without the DSP chip to do full signal decoding on the SPDIF signal. Therefore, the MUC, which cannot perform the full signal decoding on the SPDIF signal, can be used to achieve the music detection function of the SPDIF signal.

In some embodiments, the multiple times of audio detection includes a first audio detection and a second audio detection, and the first audio detection and the second audio detection are separated by a predetermined time interval. In other words, upon the completion of the first audio detection, the second audio detection is performed after the predetermined time interval. In some embodiments, the predetermined time interval can be in range between 1 ms and 2 ms. Other suitable configurations can be made for the predetermined time interval according to the actual application. In some embodiments, the predetermined time interval can be configured by a timer. By performing multiple times of audio detection at the predetermined time interval, whether there is the music playing on the SPDIF signal can be determined without frequent audio detection, thus the power consumption of the system is reduced. For example, when the MCU is used to perform multiple times of audio detection at the predetermined time interval, the MCU is less loaded than the MCU performing frequent audio detection, therefore, the power consumption is reduced.

It is to be noted a clock frequency of the SPDIF signal is 64 times of a sampling frequency of the audio data. Therefore, the audio data having a sampling frequency of 48 kHz corresponds to a SPDIF signal having a bit rate of 3.072 Mbit/s. However, the receiver not only needs the bits, but also needs a clock. Since only one electrical or optical signal to work with, the clock and the audio data have to be recoverable from the electrical or the optical signal. The SPDIF signal can achieve this purpose by using BMC. Because of the use of the BMC, the SPDIF signal have to be transmit on a clock rate which is 2 times of the bit rate. Therefore, for the audio data having 48 kHz sampling frequency, a clock rate of 6.144 MHz is needed. As the SPDIF signal based on the BMC is transmitted with such a high rate, the resource cost for performing full signal decoding on the SPDIF signal is increased. If the user only needs to detect whether there is the music playing in the SPDIF signal, the full signal decoding operation can be omitted. In addition, because of performance limitation of the low-power device, such as MCU, the full signal decoding cannot be performed on the SPDIF signal. Thus, whether there is the music playing in the SPDIF signal can be detected by sampling the SPDIF signal at a period that is available for the system and longer than the signal clock of the SPDIF signal. For example, by sampling the SPDIF signal at a period that is available for the MCU. In some embodiments, at the statistical sampling step S10 (FIG. 1), a period for sampling the SPDIF signal is several times of a length of a signal clock of the SPDIF signal. That is, the sampling period is longer than the signal clock of the SPDIF signal, and the sampling period can be always fixed.

In some embodiments, whether the number of state changes or the number of state unchanges of the SPDIF signal is within the predetermined range can be determined according to a ratio of same sampling values in the sampled data of the SPDIF signal. For example, whether the number of state changes or the number of state unchanges of the SPDIF signal is within the predetermined range can be determined according to a ratio of sampling values 1 in all sampled data of the SPDIF signal, or a ratio of sampling values 0 in all sampled data of the SPDIF signal.

Figure 3:
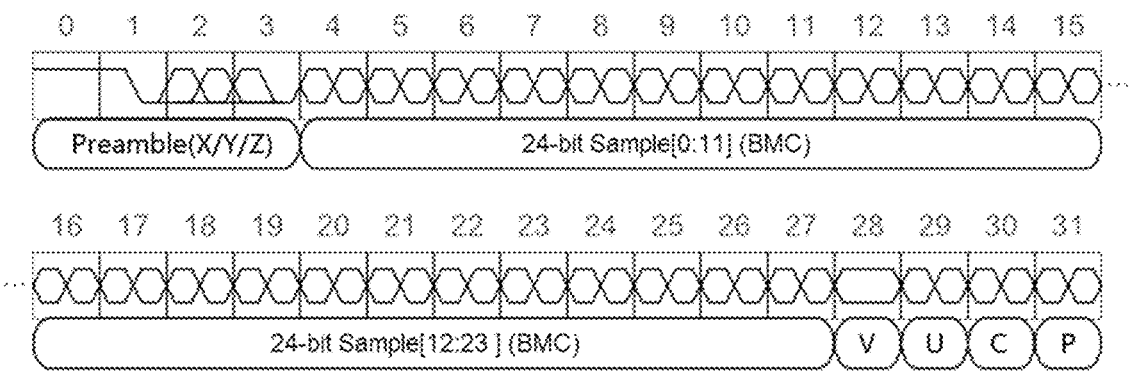
FIG. 3 illustrates a schematic diagram of a subframe structure of an SPDIF signal.

FIG. 3 illustrates a schematic diagram of a subframe structure of an SPDIF signal. One frame of the SPDIF signal includes two subframes. As shown in FIG. 3, the audio signal is transmitted by 24 bits of each group of samples in the subframe, and then each frame includes 48 bits for audio data and 24 bits for auxiliary information. Wherein the auxiliary information may be used for synchronization by the SPDIF signal, for a low-frequency signaling channel to transmit a status word which has a rate lower the sampling rate of the audio data, and for other infrequently-used data format standards. Each subframe of the SPDIF signal includes 32 bits; and the audio signal is transmitted with 24 bits in each group of sampled data. As a result, a data part encoded in BMC of the SPDIF signal is 48 bits/64 bits=75%.

Figure 4:
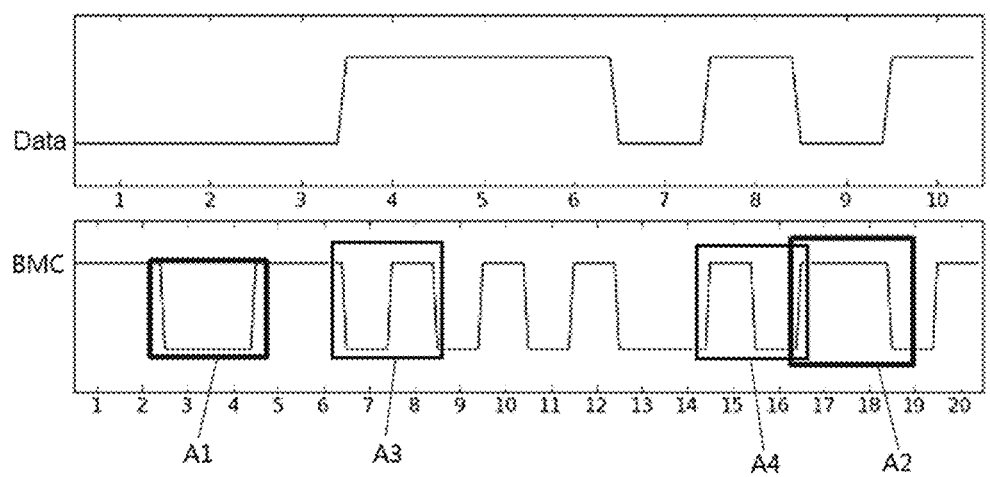
FIG. 4 illustrates a schematic diagram showing that BMC encodes 1 and 0.

It can be understood that detecting whether there is the music playing in the SPDIF signal is detecting whether sampled data streams are all zeros or not all zeros. As shown in FIG. 4, a block A1 and a block A2 schematically show the encoding of data 0 in BMC. Within one clock period in the block A1 and the block A2, the encoding has one level conversion. A block A3 and a block A4 schematically show the encoding of data 1 in BMC. Within one clock period in the block A3 and the block A4, the encoding has two level conversions. In this way, the mathematical expectation for the sampling value to be 1 (high level) or 0 (low level) for any set of data is 50%. Thus, all zeros and all ones data gives the same mathematical expectation for 1 (high level) or 0 (low level), which make it indistinguishable counting and sampling.

When the sampling period of the SPDIF signal is several even times of the length of the signal clock of the SPDIF signal, if the SPDIF signal is a muted SPDIF signal, 75% of sampling values will be represented with not altering sample sequence. For example, 75% of sampling values are at the high level, or 75% of sampling values are at the low level. Therefore, in one embodiment, when the ratio of the number of not altering sampling values in the sampled data is at least 75%, it can be considered that the number of state changes of the SPDIF signal is within the predetermined range, and thus determined that the SPDIF signal is the muted SPDIF signal.

When the sampling period of the SPDIF signal is several odd times of the length of the signal clock of the SPDIF signal, if the SPDIF signal is a muted SPDIF signal, 75% of sampling values will be represented by sequence of altering samples, high and low. Therefore, in one embodiment, when the ratio altering sampling values in the sampled data is at least 75%, it can be considered that the number of state changes of the SPDIF signal is within the predetermined range, and thus determined that the SPDIF signal is the muted SPDIF signal.

In one embodiment, the ratio of the number of not altering sampling values is at least 75%, which is further defined as: the ratio of the number of not altering sampling values obtained by continuous sampling is at least 75%. That is, in addition to the ratio of 1 or 0 in the data, a data switching probability in a series of sampled data is further considered. For example, if the sampling period is 4 times of the clock period of the SPDIF signal, 8 samplings for one frame in the SPDIF signal are performed, wherein there are 6 samplings in the data part. If the SPDIF signal is the muted SPDIF signal, the mathematical expectation on that the sampling values in the data part are all high or all low, is 100%, and a series of readings of the sampling values in the data part are not toggled. Therefore, in a condition of the muted SPDIF signal, at least 75% of the readings of sampling values series are not toggled. On the other hand, if the SPDIF signal comprises any signal (for example, a music playing signal), the mathematical expectation on that the sampling data of 1 (high level) or 0 (low level) is 50%. Thus, when there are 6 samplings in the data part, the ratio of 6 sampling values are not toggled is reduced to 5-10%.

Figure 5:
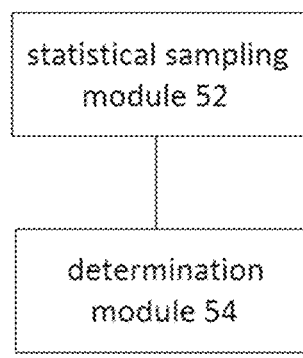
FIG. 5 illustrates a block diagram of a detection device for an audio signal according to one embodiment of the application.

As shown in FIG. 5, according to one embodiment of the application, a detection device for an audio signal is further provided, wherein the audio signal is an SPDIF signal. The detection device includes a statistical sampling module 52 and a determination module 54. The statistical sampling module 52 is configured to sample the SPDIF signal based on BMC, and count according to the sampled data to obtain the number of state changes or the number of state unchanges of the SPDIF signal. The determination module 54 is configured to determine whether the SPDIF signal is a muted SPDIF signal according to whether the number of state changes or the number of state unchanges of the SPDIF signal is within a predetermined range.

According to the above technical solutions of the application, a statistical sampling module 52 counts sampled data of an SPDIF signal to obtain the number of state changes or the number of state unchanges of the SPDIF signal, and a determination module 54 determines whether the SPDIF signal is a muted SPDIF signal according to whether the number of state changes or the number of state unchanges of the SPDIF signal is within a predetermined range, so that the application can implement a music detection function of the SPDIF signal, without full decoding on the SPDIF signal.

According to this embodiment of the application, the determination module 54 is configured to determine, when the number of state changes of the SPDIF signal is within the first predetermined range, that the SPDIF signal is the muted SPDIF signal; and determine, when the number of state changes of the SPDIF signal is within the second predetermined range, that the SPDIF signal is a music playing SPDIF signal. The second predetermined range is different from the first predetermined range. The first predetermined range and the second predetermined range may be configured according to actual applications.

According to this embodiment of the application, the statistical sampling module 52 and the determination module 54 are a program module in an MCU, a GPIO pin of the MCU is connected to the SPDIF signal, and the statistical sampling module 52 and the determination module 54 perform audio detection on the SPDIF signal input from an SPDIF pin. In some embodiments, the statistical sampling module 52 and the determination module 54 may also be implemented by an appropriate hardware circuit. In this way, the low-power MUC, which cannot perform full signal decoding on the SPDIF signal, can implement the music detection function of the SPDIF signal, thus the DSP chip is unnecessary to perform the full signal decoding on the SPDIF signal.

According to this embodiment of the application, the detection device for the audio signal may further include a timer, configured to set a time interval between two adjacent audio detections. It should be understood that the adjacent audio detections may include a first audio detection and a second audio detection; and the statistical sampling module 52 and the determination module 54 perform the first audio detection, and after a predetermined time interval, the statistical sampling module 52 and the determination module 54 perform the second audio detection. In some embodiments, the predetermined time interval may be 1 ms to 2 ms. By performing multiple times of audio detection at the predetermined time interval, whether there is the music playing in the SPDIF signal can be determined without frequent audio detection and thus the power consumption of the system is reduced. For example, when the MCU is used to perform the audio detection, the MCU is less loaded than the MCU performing frequent audio detection, therefore, the power consumption is reduced.

According to this embodiment of the application, the statistical sampling module 52 is configured to sample the SPDIF signal at a first sampling period, the first sampling period being several times of a length of a signal clock of the SPDIF signal.

According to this embodiment of the application, the determination module 54 is configured to: determine whether the number of state changes or the number of state unchanges of the SPDIF signal is within the predetermined range according to a ratio of the number of same sampling values in the sampled data.

According to this embodiment of the application, the determination module 54 is configured to: determine, when the ratio of the number is at least 75%, that the number of state changes of the SPDIF signal is within the predetermined range, and thus determine that the SPDIF signal is the muted SPDIF signal.

According to this embodiment of the application, the ratio of the number is at least 75%, which is defined as: the ratio of the number of same sampling values obtained by continuous sampling is at least 75%.

The foregoing is only preferred embodiments of the present application and is not intended to limit the present application, and any modifications, equivalent substitutions, improvements and the like within the spirit and principles of the present application are intended to be embraced by the protection scope of the present application.

The invention claimed is:

1. A detection method for an audio signal, comprising one or multiple times of audio detection, the audio signal is a SPDIF signal, and each time of the audio detection comprises:
   a statistical sampling step, sampling the SPDIF signal based on Biphase Mark Code (BMC), and counting according to the sampled data to obtain the number of state changes or the number of state unchanges of the SPDIF signal; and
   a determination step, determining whether the SPDIF signal is a muted SPDIF signal according to whether the number of state changes or the number of state unchanges of the SPDIF signal is within a predetermined range.

2. The detection method for the audio signal according to claim 1, wherein the multiple times of audio detection comprises a first audio detection and a second audio detection, and the first audio detection and the second audio detection are separated by a predetermined time interval.

3. The detection method for the audio signal according to claim 1, wherein the audio detection is performed by a Microcontroller Unit (MCU).

4. The detection method for the audio signal according to claim 1, wherein at the statistical sampling step, a period for sampling the SPDIF signal is several times of a length of a signal clock of the SPDIF signal.

5. The detection method for the audio signal according to claim 1, wherein determining whether the number of state changes or the number of state unchanges of the SPDIF signal is within the predetermined range according to a ratio of the number of same sampling values in the sampled data.

6. The detection method for the audio signal according to claim 5, wherein when the ratio of the number is at least 75%, determining the number of state changes of the SPDIF signal is within the predetermined range and the SPDIF signal is the muted SPDIF signal.

7. The detection method for the audio signal according to claim 6, wherein the ratio of the number is at least 75% defined as: the ratio of the number of same sampling values obtained by continuous sampling is at least 75%.

8. The detection method for the audio signal according to claim 1, wherein when the number of state changes of the SPDIF signal is within a first predetermined range, determining that the SPDIF signal is muted SPDIF signal; and
when the number of state changes of the SPDIF signal is within a second predetermined range, determining that the SPDIF signal is a music playing SPDIF signal, the second predetermined range being different from the first predetermined range.

9. A detection device for an audio signal, wherein the audio signal is a SPDIF signal, and the detection device comprises:
a statistical sampling module, configured to sample the SPDIF signal based on Biphase Mark Code (BMC), and count according to the sampled data to obtain the number of state changes or the number of state unchanges of the SPDIF signal; and
a determination module, configured to determine whether the SPDIF signal is a muted SPDIF signal according to whether the number of state changes or the number of state unchanges of the SPDIF signal is within a predetermined range.

10. The detection device for the audio signal according to claim 9, further comprising a timer, configured to set a time interval between two adjacent audio detections.

11. The detection device for the audio signal according to claim 9, wherein the statistical sampling module and the determination module are a program module in a Microcontroller Unit (MCU), a GPIO pin of the MCU is connected with an SPDIF pin, and the statistical sampling module samples the SPDIF signal input from the SPDIF pin.

12. The detection device for the audio signal according to claim 9, wherein the statistical sampling module is configured to sample the SPDIF signal at a first sampling period, the first sampling period being several times of a length of a signal clock of the SPDIF signal.

13. The detection device for the audio signal according to claim 9, wherein the determination module is configured to: determine whether the number of state changes or the number of state unchanges of the SPDIF signal is within the predetermined range according to a ratio of the number of same sampling values in the sampled data.

14. The detection device for the audio signal according to claim 13, wherein the determination module is configured to: when the ratio of the number is at least 75%, determine the number of state changes of the SPDIF signal is within the predetermined range and the SPDIF signal is the muted SPDIF signal.

15. The detection device for the audio signal according to claim 14, wherein the ratio of the number is at least 75% defined as: the ratio of the number of same sampling values obtained by continuous sampling is at least 75%.

16. The detection device for the audio signal according to claim 10, wherein the determination module is configured to:
determine, when the number of state changes of the SPDIF signal is within a first predetermined range, that the SPDIF signal is the muted SPDIF signal; and
determine, when the number of state changes of the SPDIF signal is within a second predetermined range, that the SPDIF signal is a music playing SPDIF signal, the second predetermined range being different from the first predetermined range.

* * * * *